(12) United States Patent
Hendey

(10) Patent No.: US 6,588,447 B1
(45) Date of Patent: Jul. 8, 2003

(54) BREAK-AWAY WATER METER REGISTER RETAINING RING

(76) Inventor: Arthur A. Hendey, P.O. Box 529, Beaumont, CA (US) 92223

( * ) Notice: Subject to any disclaimer, the term of this patent is extended or adjusted under 35 U.S.C. 154(b) by 0 days.

(21) Appl. No.: 10/190,797

(22) Filed: Jul. 9, 2002

(51) Int. Cl.⁷ .............................................. G01F 15/18
(52) U.S. Cl. ...................... 137/315.06; 29/700; 73/201; 73/273; 137/315.41; 137/797
(58) Field of Search ................. 137/15.03, 67, 137/68.11, 315.06, 315.41, 797; 73/198, 201, 273; 29/700; 220/284, 259.2, 377, 663, 664; 285/2, 18, 39

(56) References Cited

U.S. PATENT DOCUMENTS

| | | | | |
|---|---|---|---|---|
| 786,724 A | * | 4/1905 | Browne | 73/273 |
| 2,016,606 A | * | 10/1935 | Krueger | 73/273 |
| 3,067,612 A | * | 12/1962 | Smith | 73/273 |
| 3,068,696 A | * | 12/1962 | Smith et al. | 73/273 |
| 3,308,664 A | * | 3/1967 | Kullmann | 73/273 |
| 4,663,970 A | * | 5/1987 | Sutherland | 73/273 |
| 5,339,686 A | * | 8/1994 | DeJarlais et al. | 73/201 |
| 5,546,801 A | * | 8/1996 | Swinson et al. | 73/273 |
| 5,557,041 A | * | 9/1996 | Sanford, Jr. | 73/273 |

\* cited by examiner

Primary Examiner—George L. Walton
(74) Attorney, Agent, or Firm—Morland C. Fischer

(57) ABSTRACT

A break-away ring manufactured from a frangible material and removably received by a water meter of the type used to measure the volume of water consumed by a residence or a commercial facility. The break-away ring applies a holding pressure for retaining within the water meter a register to measure the volume of water consumed. The ring has a plurality of notches formed therein. A tool is inserted in one of the notches for prying the break-away ring outwardly from the water meter, whereby to break the ring and end the holding pressure generated thereby. Accordingly, the register can now be easily lifted out of the water meter for repair or replacement. The foregoing removal of the register is accomplished without having to either interrupt the water service to the consumer or disconnect the water meter from the consumer's water line.

11 Claims, 2 Drawing Sheets

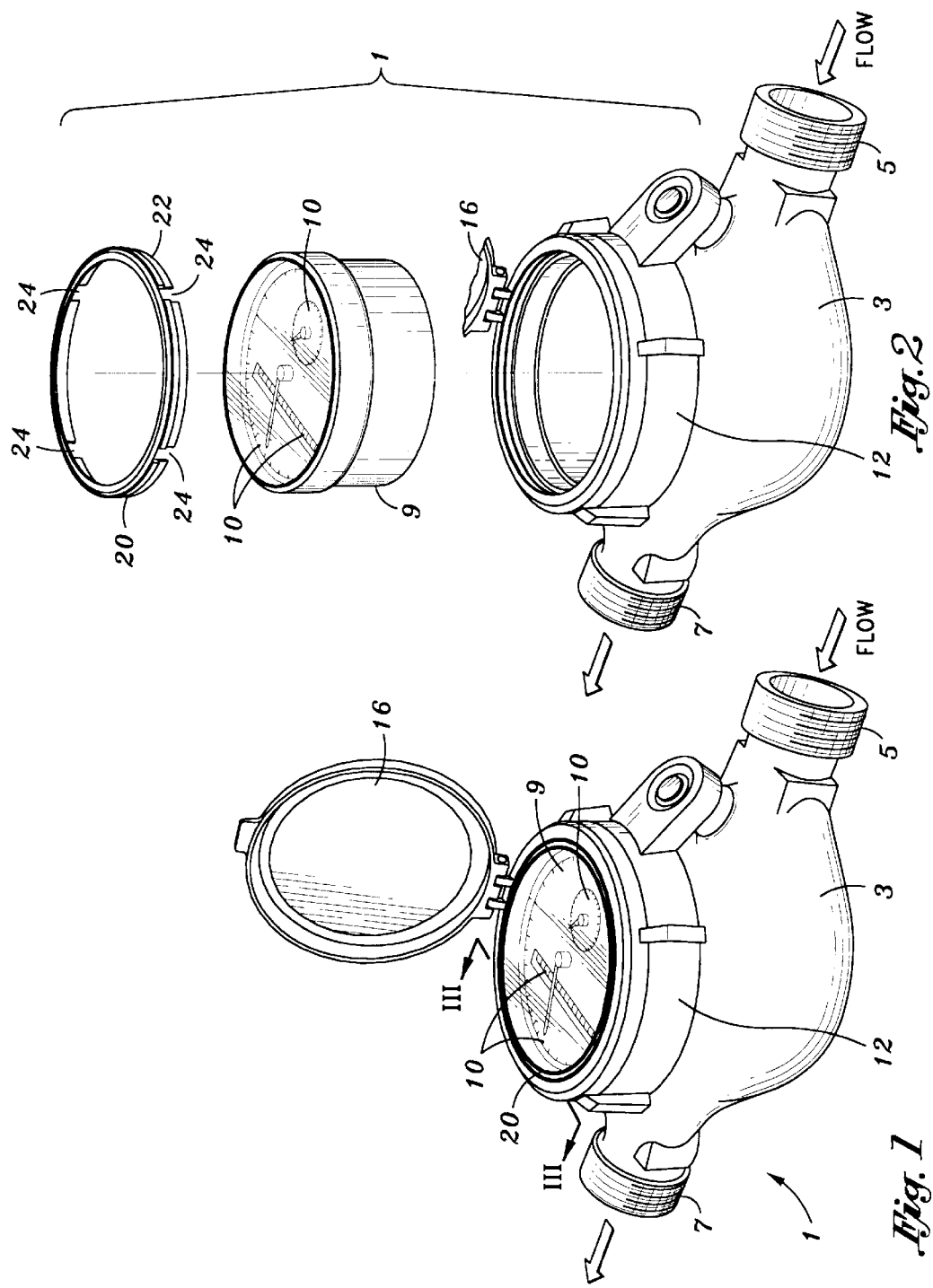

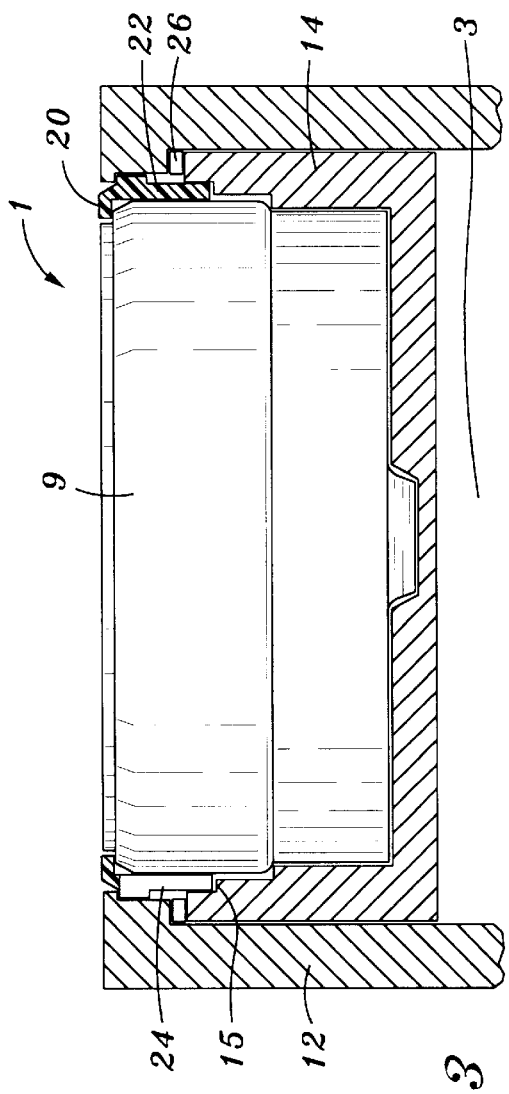
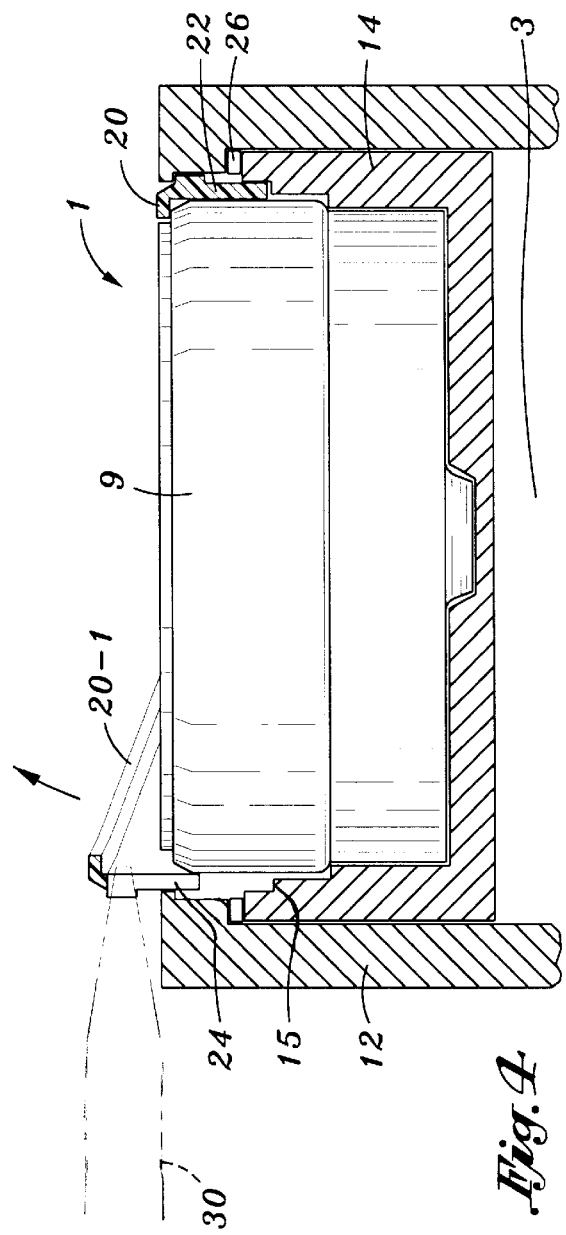

BREAK-AWAY WATER METER REGISTER RETAINING RING

BACKGROUND OF THE INVENTION

1. Field of the Invention

This invention relates to a break-away ring that is manufactured from a frangible material and removably received by a water meter so as to generate a holding pressure by which to retain the water meter register. The break-away ring is adapted to be broken as it is pried outwardly from the water meter to enable a workman in the field to gain access to and remove the register for repair or replacement without having to either interrupt the water service to the consumer or disconnect the water meter from the consumer's water supply line.

2. Background Art

Water meters have different uses including the ability to monitor the consumption of water supplied to a residence or a business from a local reservoir. The conventional water meter includes a register that is capable of measuring and providing a visual indication of the water flowing through the meter to the consumer. Because it is a mechanical device having moving parts that respond to water consumption, the register may, over time, become defective and require repair or replacement in the field.

In this case, a workman will typically visit the site of the water meter having the defective register in need of service. Because it is difficult to gain access to and remove the defective register from the conventional water meter, it is common for the workman to have to disconnect the water meter from the consumer's water supply line. Consequently, the consumer's water service must first be interrupted before the water meter can be disconnected. In this regard, scheduling problems and delays may arise in trying to arrange the interruption of water service without inconveniencing the consumer. Accordingly, the usual process of repairing or replacing a defective water meter can be time consuming, relatively expensive, and annoying to consumers and workmen, alike.

Therefore, what is desirable is a water meter that can be quickly, easily and efficiently serviced in the field in order to repair or replace a defective register without having to either interrupt the water service to the consumer or disconnect the water meter from the consumer's water supply line.

SUMMARY OF THE INVENTION

In general terms, a break-away water meter register retaining ring is disclosed for use in a water meter of the type commonly employed to measure the volume of water supplied from a source (e.g. the water supply of a municipality) and delivered to a residence or a business facility. The break-away ring is manufactured from a frangible (e.g. plastic) material and includes a plurality of notches spaced around the circumference thereof. The notches create relatively weak areas or break points at which the break-away ring is adapted to be broken. The water meter includes a hollow body through which a flow path is established, a register to measure and indicate the volume of water consumed by the user, and an open receptacle located above the hollow body to accommodate and position the register relative to the flow path in order to be responsive to the volume of water delivered to the consumer. In the assembled water meter configuration, the break-away ring is pressed inwardly through the open receptacle so as to surround the register within the receptacle. In this configuration, the break-away ring lies between the register and the receptacle to generate a holding pressure for retaining the register within its receptacle.

When it is necessary for a workman in the field to remove a defective register for repair or replacement, a suitable tool is inserted through the receptacle and into one of the notches formed in the break-away ring. The tool applies an upward pushing force at the notch within which it is inserted so that the ring is broken as it is pried outwardly from the water meter. The ring may now be grasped and peeled away from the water meter, whereby to end the holding pressure that has been generated by the ring to retain the register within the receptacle. By applying a suction force, the workman may now simply lift the defective register out of its receptacle. A new or repaired register is then dropped into the receptacle, and a new break-away ring is installed in surrounding engagement with the register. By virtue of the foregoing, the defective register can be efficiently repaired without having to either interrupt the water service to the consumer or disconnect the water meter from the consumer's water line.

BRIEF DESCRIPTION OF THE DRAWINGS

FIG. 1 shows a water meter for measuring water consumption including the break-away water meter register retaining ring which forms the present invention;

FIG. 2 is an exploded view of the water meter shown in FIG. 1;

FIG. 3 is a cross-section of the water meter taken along lines 3—3 of FIG. 2; and FIG. 4 shows a tool being used to pry the break-away ring outwardly from the water meter so that a defective water meter register can be removed for repair or replacement.

DETAILED DESCRIPTION

The break-away water meter register retaining ring which forms the present invention is initially described while referring to FIGS. 1–3 of the drawings, where there is shown a water meter 1 of the type commonly used to measure the volume of water flowing from a source (e.g. the water supply of a municipality) to a consumer (e.g. a residence or a commercial facility). The water meter 1 includes a hollow metallic (e.g. steel) body 3 having a water inlet port 5 and a water outlet port 7 to establish a flow path through the hollow body 3. Inlet and outlet ports 5 and 7 are threaded to facilitate their being coupled between a correspondingly threaded water service pipeline (not shown) which communicates with the water source and an inlet line leading to the consumer.

A conventional register 9 is provided by which to indicate and record the volume of water (e.g. in cubic feet) that flows through the body 3 of water meter 1. By way of example, the register 9 illustrated in the drawings is a commercially available electromagnetically controlled metering device having an analog display 10 by which to enable meter readers to monitor the volume of water consumed by the user.

Located above the body 3 of water meter 1 is a hollow, cylindrical receptacle 12. The receptacle 12 is opened and sized to accommodate therewithin and surround the register 9, whereby the register 9 will be aligned relative to the hollow body 3 of water meter 1 in order to be responsive to the volume of water flowing therethrough.

In the assembled water meter configuration illustrated in FIG. 3, the register 9 is shown seated within and supported by a cup-shaped base 14 that is located inwardly of and enclosed by the open receptacle 12 so that the bottom of the base 14 extends across the body 3 of water meter 1. When the water meter 1 is installed for operation at a residential or commercial site, the register 9 is seated within the cup-shaped base 14 so as to lie flush with the top of hollow receptacle 12. A lid 16 (best shown in FIG. 1) is pivotally connected to the receptacle 12 of water meter 1 so as to control visual access to the display 10 of register 9. That is, the lid 16 is rotated from a closed position over top the register 9 to an open position when it becomes necessary to read the display 10.

In a conventional water meter for residential and commercial use, it has heretofore been a laborious and time consuming task for a workman in the field to gain a hold of and remove the register 9 from the body 3 of water meter 1 in the event the register 9 is in need of repair or replacement. Consequently, the workman is typically required to first shut off water service to the consumer and then disconnect the water meter 1 from the water lines before he is able to remove the defective register for repair or replacement.

In accordance with the present improvement, and continuing to refer to FIGS. 1–3, a removable break-away register retaining ring 20 is carried by the water meter 1 so as to advantageously eliminate the usual cumbersome task of gaining access to and removing a defective water meter register in the field. The removable break-away ring 20 is manufactured from a frangible material such as plastic, or the like. As is best shown in FIG. 2, the break-away ring 20 has a circumferentially extending lip 22 depending downwardly therefrom. A plurality of notches 24 are formed in and spaced around the lip 22 to establish a corresponding number of relatively weak areas in the structural integrity of the break-away ring 20. By way of example only, each notch 24 formed in the lip 22 of break-away ring 20 has a height of about 3 millimeters and a width of about 4 millimeters. The notches 24 create relatively thin break points around the ring 20 to achieve an advantage that will soon be described.

In the assembled water meter configuration of FIG. 3, the removable break-away ring 20 is pressed inwardly through the top of the receptacle 12 so as to surround the register 9. In this position, the ring 20 will lie between the register 9 and the hollow receptacle 12 within which the register 9 is received. The lip 22 depending downwardly from ring 20 slides along the register 9 for receipt by a groove 15 that is formed around the top of the. cup-shaped base 14 within which the register 9 is seated. To complete the assembly of water meter 1, a metallic spacing ring 26 is positioned between the hollow receptacle 12 and the cup-shaped base 14, whereby the receptacle 12 is spaced slightly above the base 14. With the break-away ring 20 properly installed in water meter 1 in the manner just described, a holding pressure is established by which the register 9 will be retained within the cup-shaped base 14 and surrounded by the receptacle 12.

A method by which a workman in the field can quickly and easily gain access to and remove the register 9 from the water meter 1 should the register become defective and require repair or replacement is now described while referring to FIG. 4 of the drawings. In this case, a suitable tool (shown in phantom lines and designated by reference numeral 30) having a narrow or tapered tip can be used by the workman to pry the removable break-away ring 20 loose from the water meter 1.

More particularly, the tip of the tool 30 is wedged between the register 9 and the open receptacle 12 within which the register 9 is received. The tool 30 is manipulated by the workman so that the narrow tip thereof will capture the break-away ring 20 at one of the notches 24 that are formed in lip 22. By applying an upward pushing force on the tool 30, the break-away ring 20 will be removed from the groove 15 that runs around base 14 and pulled outwardly from water meter 1 (as represented by reference numeral 20-1).

Inasmuch as the removable break-away ring 20 is manufactured from a frangible material, the upward prying force applied by the tool 30 will cause the ring 20 to break at the relatively thin notch 24 within which tool 30 is inserted. Thus, the workman may now use a gripping tool (e.g. needle nose pliers, or the like) to grasp the broken ends of the break-away ring 20 to simply peel said ring away from water meter 1.

In this same regard, the break-away ring 20 of this invention also functions as a tamper indicator to provide a reliable indication of tampering with the register 9 by one wishing to alter the readings thereof. That is to say, should there be an unauthorized attempt to remove the register 9, the break-away ring 20 will be similarly broken at one of the notches 24, whereby an easy to recognize sign of such tampering will become and remain plainly visible.

With the break-away ring 20 removed from water meter 1, the aforementioned holding pressure that was previously established by ring 20 to retain register 9 within the cup-shaped 14 base 14 is correspondingly ended. Accordingly, the workman may use a suction device to lift the register in need of repair off the base 14 and outwardly from the receptacle 12. At this point, either a new or a repaired register is simply dropped into the cup-shaped base 14. A new break-away ring 20 is installed between register 9 and receptacle 12 to re-establish the holding pressure necessary for retaining the register 9 within the water meter 1.

It may be appreciated that by virtue of the removable break-away water meter register retaining ring 20 herein disclosed, a register may be removed from and returned to a water meter 1 that is still operating under normal pressure without having to either interrupt the water service to the consumer or disconnect the water meter. The foregoing enables repairs to be completed more easily, quickly and at less cost to the consumer, while minimizing inconvenience to the consumer (by not requiring an advance appointment so as to be able to identify a sufficient time during which to shut off the consumer's water service). The removable break-away ring 20 of this invention is inexpensive to manufacture, easy to dislodge from a water meter, and simple to install so that field repairs of defective water meter registers can be completed more efficiently than in the past.

I claim:

1. A water meter comprising a hollow body to which a volume of water is supplied from a source, a register to measure the volume of water flowing through the hollow body from the source, a receptacle coupled to the hollow body within which to receive and position the register to measure the volume of water flowing through the hollow body, and a ring removably received between the register and the receptacle for generating a holding pressure by which to retain the register within the receptacle, said ring being removable from the water meter to correspondingly end said holding pressure and thereby permit the register to be lifted out of the receptacle for purposes of repair or replacement.

2. The water meter recited in claim 1, wherein said removable ring for generating said holding pressure is manufactured from a frangible material.

3. The water meter recited in claim 1, wherein said removable ring for generating said holding pressure is adapted to be broken when said ring is removed from said water meter.

4. The water meter recited in claim 1, wherein said removable ring for generating said holding pressure includes at least one notch formed therein, said notch being sized for receipt of a tool therein at which said ring is adapted to be pried outwardly and removed from said water meter.

5. The water meter recited in claim 4, wherein said removable ring to be pried outwardly and removed from said water meter is manufactured from a breakable material.

6. The water meter recited in claim 5, wherein the breakable material from which said removable ring is manufactured is plastic.

7. The water meter recited in claim 5, wherein said removable ring is broken at said at least one notch formed therein when said removable ring is pried outwardly and removed from said water meter by the tool received within said notch.

8. The water meter recited in claim 4, further comprising a cup-shaped base upon which the register is supported so as to be positioned to measure the volume of water flowing through the hollow body, said cup-shaped base being enclosed by said receptacle and including a groove formed therein at which to receive and locate said removable ring between the register and the receptacle in order to generate said holding pressure.

9. The water meter recited in claim 8, further comprising a spacer disposed between the cup-shaped base and the receptacle by which the receptacle is spaced above the cup-shaped base to permit the tool to be inserted inwardly of the receptacle for receipt by said at least one notch formed in said removable ring.

10. For a water meter including a hollow body to which a volume of water is supplied from a source, a register to measure the volume of water flowing through the hollow body and a receptacle coupled to the hollow body within which to receive and position the register to measure the volume of water flowing through the hollow body, the improvement comprising a ring removable received between the register and the receptacle for generating a holding pressure by which to retain the register within the receptacle, said removable ring having at least one notch formed therein at which to receive a tool adapted for prying said removable ring outwardly from said water meter and thereby ending said holding pressure generated by said ring in order to enable the register to be lifted out of the receptacle to be repaired or replaced.

11. For the water meter recited in claim 10, said removable ring being manufactured from a breakable material and adapted to be broken at said at least one notch formed therein when said ring is pried outwardly from said water meter by the tool received in said at least one notch thereof.

* * * * *